US011235765B2

(12) United States Patent
Sato

(10) Patent No.: US 11,235,765 B2
(45) Date of Patent: Feb. 1, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 99 days.

(21) Appl. No.: 16/829,824

(22) Filed: Mar. 25, 2020

(65) Prior Publication Data

US 2020/0307582 A1    Oct. 1, 2020

(30) Foreign Application Priority Data

Mar. 27, 2019 (JP) .............................. JP2019-060687

(51) Int. Cl.
*B60W 30/16* (2020.01)
*B60W 30/18* (2012.01)
(Continued)

(52) U.S. Cl.
CPC ............ *B60W 30/16* (2013.01); *B60W 10/04* (2013.01); *B60W 10/20* (2013.01); *B60W 30/18163* (2013.01); *B60W 40/04* (2013.01)

(58) Field of Classification Search
CPC ...... B60W 30/16; B60W 10/04; B60W 10/20; B60W 30/18163; B60W 40/04
See application file for complete search history.

(56) References Cited

U.S. PATENT DOCUMENTS 8,577,553 B2     11/2013 Nitta et al.
8,700,299 B2 *   4/2014 Morita ............. G08G 1/096716
                                                            701/123
(Continued)

FOREIGN PATENT DOCUMENTS

DE          60223968 T2     12/2008
DE       102016009709      2/2017
(Continued)

OTHER PUBLICATIONS

Office Action dated Jul. 23, 2021 issued in India Patent Application No. 202014009394.
(Continued)

*Primary Examiner* — Hussein Elchanti
(74) *Attorney, Agent, or Firm* — Cozen O'Connor

(57) ABSTRACT

A driving control with environmental condition estimating including surrounding recognition function for recognizing a vehicle's lane and neighboring lanes and other vehicles and a function for obtaining the vehicle's state, a path generating part for generating a path based on information from the environmental condition estimating, and a vehicle control for speed and steering control for causing the vehicle to follow the path. The environmental condition estimating obtains the vehicle's position near a toll plaza, having a vehicle ahead following function for targeting a vehicle ahead. The driving control alters override threshold values serving as a determination criterion of the operation intervention for stopping the vehicle ahead following function and a path following function to a value greater than during driving in a general section with lane markings when the vehicle's own position reaches a predetermined point before the toll plaza.

12 Claims, 8 Drawing Sheets

(51) Int. Cl.
*B60W 40/04* (2006.01)
*B60W 10/20* (2006.01)
*B60W 10/04* (2006.01)

(56) References Cited

U.S. PATENT DOCUMENTS

| | | | |
|---|---|---|---|
| 9,637,107 B2 | 5/2017 | Matsuno et al. | |
| 9,665,779 B2 | 5/2017 | Ooi | |
| 9,775,004 B2* | 9/2017 | Cawse | G08G 1/20 |
| 9,809,164 B2 | 11/2017 | Matsuno et al. | |
| 10,365,115 B2* | 7/2019 | Nair | G01C 21/3492 |
| 2003/0014162 A1 | 1/2003 | Sadano | |
| 2005/0015203 A1* | 1/2005 | Nishira | G08G 1/167 |
| | | | 701/301 |
| 2005/0104745 A1* | 5/2005 | Bachelder | G08G 1/07 |
| | | | 340/906 |
| 2005/0187701 A1* | 8/2005 | Baney | G08G 1/096716 |
| | | | 701/117 |
| 2009/0167561 A1* | 7/2009 | Liang | G08G 1/0104 |
| | | | 340/907 |
| 2009/0287401 A1* | 11/2009 | Levine | G08G 1/0141 |
| | | | 701/117 |
| 2010/0030458 A1* | 2/2010 | Coughlin | B60W 40/09 |
| | | | 701/123 |
| 2010/0082190 A1* | 4/2010 | Jinno | B60K 6/543 |
| | | | 701/22 |
| 2010/0161192 A1* | 6/2010 | Nara | G01C 21/26 |
| | | | 701/70 |
| 2010/0171640 A1* | 7/2010 | Delia | G08G 1/07 |
| | | | 340/907 |
| 2010/0308986 A1* | 12/2010 | Dobryden | G08C 17/02 |
| | | | 340/438 |
| 2011/0043348 A1* | 2/2011 | Blackard | F16H 63/42 |
| | | | 340/439 |
| 2011/0126797 A1* | 6/2011 | Russell | F02D 19/0692 |
| | | | 123/294 |
| 2014/0156182 A1* | 6/2014 | Nemec | B62D 15/0295 |
| | | | 701/430 |
| 2014/0336913 A1* | 11/2014 | Fino | G08G 1/096844 |
| | | | 701/117 |
| 2015/0145995 A1* | 5/2015 | Shahraray | H04L 67/12 |
| | | | 348/148 |
| 2015/0154860 A1* | 6/2015 | Holzwanger | G08G 1/0967 |
| | | | 340/944 |
| 2016/0148507 A1* | 5/2016 | Pittman | G06Q 30/0255 |
| | | | 340/917 |
| 2016/0358463 A1* | 12/2016 | Cho | G08G 1/04 |
| 2017/0018189 A1* | 1/2017 | Ishikawa | G05D 1/0088 |
| 2017/0124868 A1* | 5/2017 | Bhat | G08G 1/09623 |
| 2017/0154525 A1* | 6/2017 | Zou | G08G 1/08 |
| 2018/0023951 A1 | 1/2018 | Seo et al. | |
| 2018/0075739 A1* | 3/2018 | Ginsberg | G08G 1/0145 |
| 2018/0151064 A1* | 5/2018 | Xu | G08G 1/0116 |
| 2018/0157258 A1* | 6/2018 | O'Brien | G05D 1/0088 |
| 2018/0253968 A1* | 9/2018 | Yalla | G08G 1/097 |
| 2018/0261083 A1* | 9/2018 | Sun | G08G 1/0112 |
| 2018/0354518 A1* | 12/2018 | Inou | G05D 1/0214 |
| 2018/0370542 A1 | 12/2018 | Braunagel et al. | |
| 2019/0071099 A1* | 3/2019 | Nishiguchi | B62D 15/0255 |
| 2019/0082377 A1* | 3/2019 | Silver | G08G 1/096741 |
| 2019/0084572 A1* | 3/2019 | Oishi | B60W 10/00 |
| 2019/0122178 A1* | 4/2019 | Kempf | G06Q 10/08355 |
| 2019/0122548 A1* | 4/2019 | Sakuma | G08G 1/0145 |
| 2019/0180617 A1* | 6/2019 | Hori | G08G 1/0112 |
| 2019/0227546 A1 | 7/2019 | Sato | |
| 2019/0272747 A1* | 9/2019 | Raamot | G08G 1/08 |
| 2020/0184238 A1* | 6/2020 | Kobayashi | G06T 7/70 |
| 2020/0269839 A1 | 8/2020 | Sato | |
| 2020/0282990 A1 | 9/2020 | Sato | |
| 2020/0307582 A1* | 10/2020 | Sato | B60W 60/0053 |

FOREIGN PATENT DOCUMENTS

| | | |
|---|---|---|
| DE | 102016007187 | 6/2017 |
| DE | 102017210299 | 12/2018 |
| IN | 202014006718 | 8/2020 |
| IN | 202014006875 | 9/2020 |
| JP | 2009-149255 | 7/2009 |
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2019-051894 | 4/2019 |
| JP | 2019-127136 | 8/2019 |
| WO | WO 2009/086857 | 7/2009 |

OTHER PUBLICATIONS

Office Action dated Oct. 7, 2021 issued in related U.S. Appl. No. 16/597,540.

Office Action dated Nov. 9, 2021 issued in German Patent Application No. 10 2020 100 343.9.

* cited by examiner

DRIVING CONTROL APPARATUS FOR VEHICLE

FIELD OF THE INVENTION

The present invention relates to a driving control apparatus for a vehicle, and more particularly, relates to an override function in a partially automated lane change system.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" and a "partially automated lane change system (PALS)" based on these techniques are being promoted.

Such a driving control system is only for the purpose of driving support and is different from completely automatic driving. A driver is required to place hands on the steering wheel and keep track of the driving situation so as to be able to manually drive at any time, the driver needs to respond in accordance with the situation, and the driving control system has an override function that switches to manual driving by the driver's operation intervention even while the system is operating. Patent Literature 1 discloses a vehicle lateral movement control device that determines change speed (fallback speed) of a fallback control amount to shift to manual driving according to change speed of a steering operation amount input by a driver.

In JP 2012-096569 A, if the change in speed of the steering operation amount is large, it is regarded as steering intervention intended by the driver and driving is shifted to manual driving in a short time, and if the change in speed of the steering operation amount is small, fallback control is performed relatively taking more time, and driving is shifted to manual driving. However, the large change in speed of the steering operation amount does not necessarily mean steering intervention intended by the driver, nor does fallback control corresponding to the change in speed of the steering operation amount necessarily mean control suitable for the movement state of the vehicle.

For example, when another vehicle enters a predetermined area of a target lane by cutting-in or the like during automated lane change by the PALS, automated lane change stop is notified, and if there is no other vehicle in a predetermined area of an original lane, the vehicle returns to the original lane by an automated lane return function, but if there is another vehicle, the driver is notified of authority transfer. In a section with no lane mark before a toll plaza, the vehicle shifts to vehicle ahead following cruise or path following cruise targeting a toll gate.

When the driver is notified of the automated lane change stop, authority transfer, and an operation takeover request, it may be assumed that the vehicle comes close to other vehicles or the vehicle's behavior becomes unstable due to override by excessive steering intervention or override by excessive brake operation of the driver who is overwhelmed by the notification.

The vehicle shifts to vehicle ahead following cruise or path following cruise targeting a driving lane ahead in a merging section after passing through the toll plaza, but when the vehicle ahead following cruise or path following cruise cannot be continued due to cutting-in of another vehicle or the like and the driver is notified of the authority transfer and operation takeover request, it may be assumed that the vehicle comes close to other vehicles or the vehicle's behavior becomes unstable due to override by excessive steering intervention or brake operation intervention of the driver who is overwhelmed by the notification.

SUMMARY OF THE INVENTION

The present invention has been made in view of the above-described actual situation, and an object is to prevent getting close to other vehicles and unstable behavior due to excessive operation intervention during a transition process to vehicle ahead following cruise or path following cruise or during operation takeover in a toll plaza section.

In order to solve the above-described problems, an embodiment of the present invention is directed to a driving control apparatus for a vehicle, including:

an environmental condition estimating part including a surrounding recognition function for recognizing a vehicle's lane and neighboring lanes and other vehicles in the respective lanes and a function for obtaining the vehicle's moving state;

a path generating part for generating a target path on the basis of information obtained by the environmental condition estimating part; and a vehicle control part configured to perform speed control and steering control for causing the vehicle to follow the target path, wherein the environmental condition estimating part includes means for obtaining the vehicle's own position near a toll plaza, having a vehicle ahead following function for driving targeting a vehicle ahead, characterized in that, when the vehicle's own position reaches a predetermined point near a section with no lane marking before the toll plaza, override threshold values serving as a determination criterion of the operation intervention for stopping the vehicle ahead following function and a path following function are configured to be altered to a value greater than during driving in a general section with lane markings.

According to the driving control apparatus for the vehicle according to an embodiment of the present invention, because, when the vehicle's own position reaches the predetermined point near the section with no lane marking before the toll plaza, the override threshold values serving as the determination criterion of the operation intervention for stopping the vehicle ahead following function and path following function are configured to be altered to a value greater than during driving in the general section with lane markings, it is advantageous in preventing getting close to other vehicles and unstable behavior due to excessive operation intervention during a transition process to vehicle ahead following cruise or path following cruise or during operation takeover in the toll plaza section.

DETAILED DESCRIPTION OF THE DRAWINGS

Hereinafter, an embodiment of the present invention will be described in detail with reference to the drawings.

Figure 1:
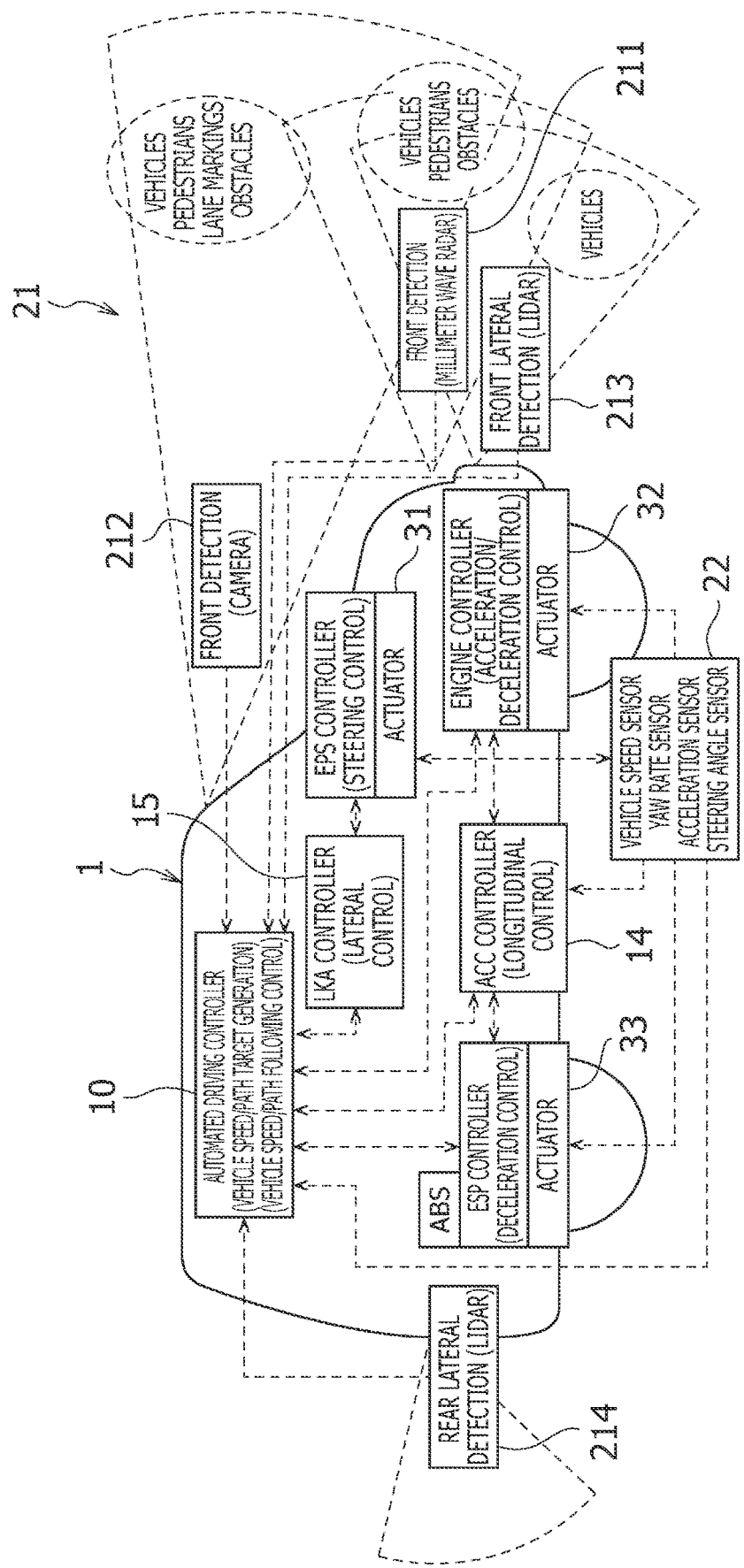
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them to perform path following control and implementing partially automated in-lane driving (PADS) and automated lane change (PALS) in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
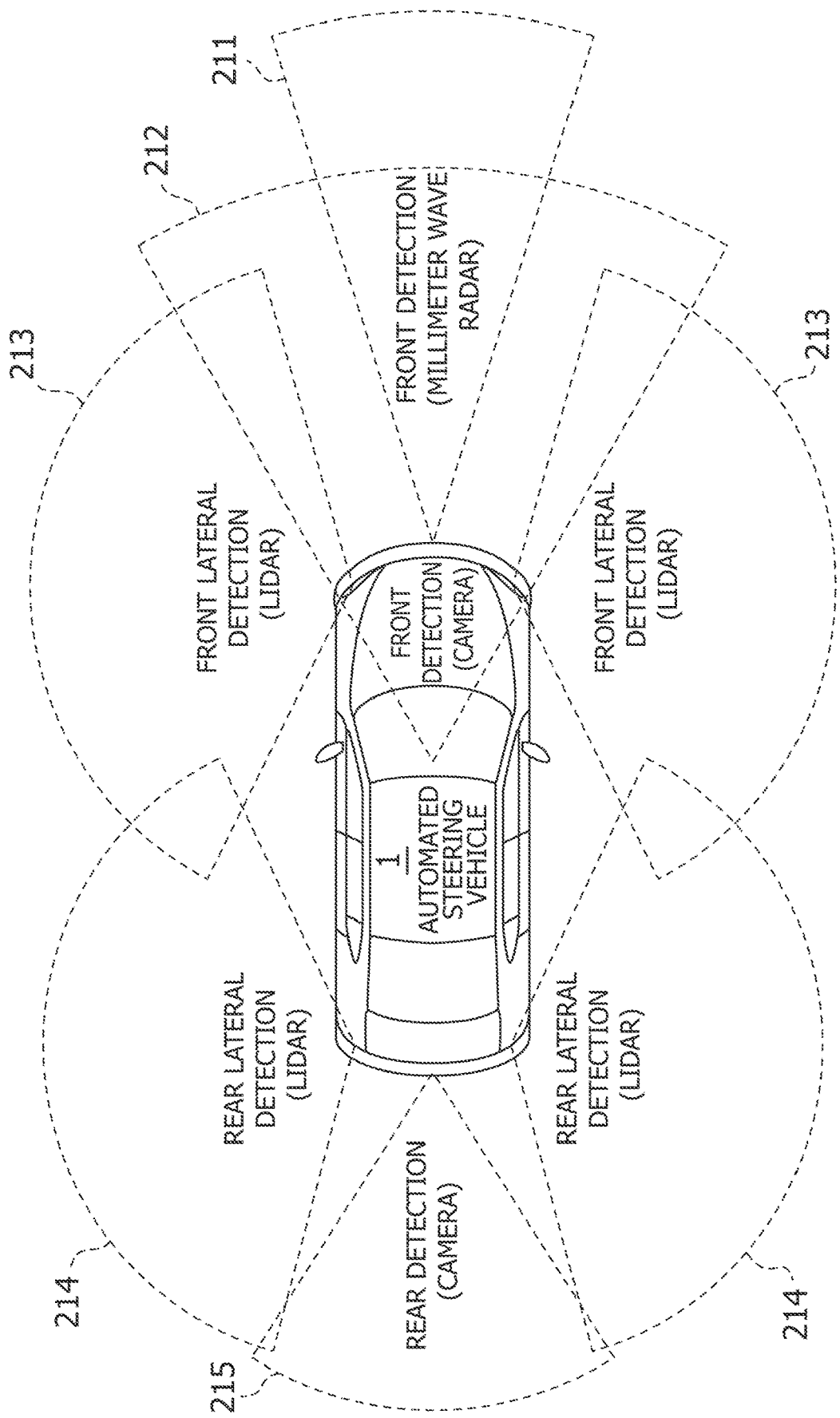
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
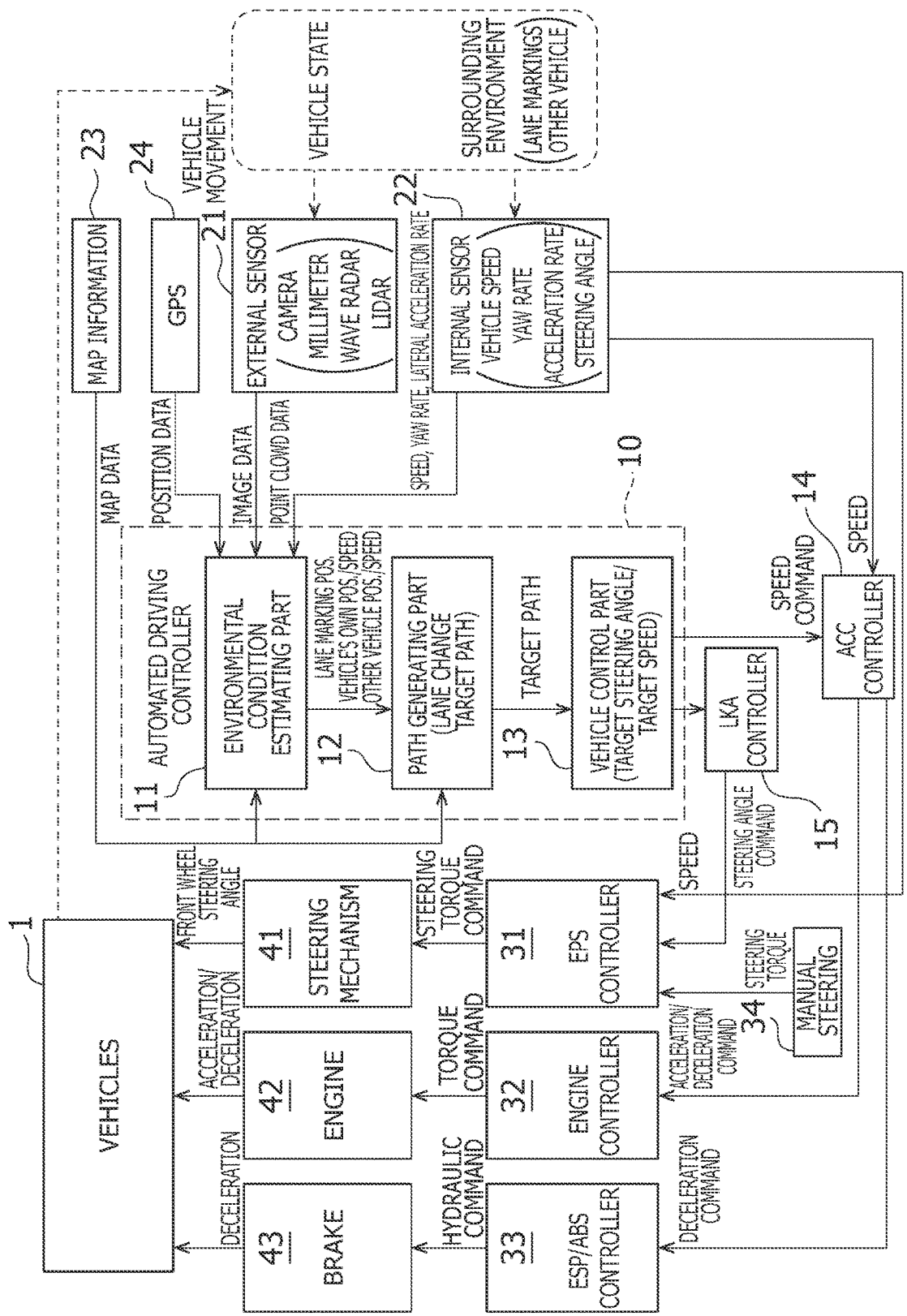
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by matching the vehicle's own position information by positioning means 24 such as a GPS and map information 23, and on the basis of external data such as the image data and point cloud data obtained by the external sensor 21, estimates positions of lane markings of the vehicle's own driving lane and the neighboring lane, and positions and speeds of other vehicles. In addition, it acquires the vehicle's moving state from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of Partially Automated in-Lane Driving System and Partially Automated Lane Change System Next, outlines of a partially automated in-lane driving system (PADS) and a partially automated lane change system (PALS) will be explained on the assumption of traveling on a highway.

Partially automated driving (PADS driving) and partially automated lane change (PALS) are enabled in a state in which both ACC controller 14 included in the ACCS and LKA controller 15 included in the LKAS together with the automated driving controller 10 are operating.

At the same time as operation of the partially automated in-lane driving system, the automated driving controller 10

(path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after Δt seconds from a relationship between a yaw rate γ and lateral acceleration ($d^2y/dt^2$) occurring due to vehicle movement by the vehicle's own position and movement characteristics of the vehicle itself, that is, a front wheel steering angle δ occurring when a steering torque T is applied to the steering mechanism 41 during traveling at a vehicle speed V, gives a steering angle command that makes the lateral displacement to "yt" after Δt seconds to the EPS controller 31 via the LKA controller 15, and gives a speed command that makes the speed to "Vt" after Δt seconds to the ACC controller 14.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) and the partially automated lane change system (PALS) are operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

The partially automated lane change system (PALS) is a system that automatically performs lane change by the driver's instruction or approval and is implemented by combining longitudinal control (speed control and inter-vehicle distance control) by the ACC controller 14 and lateral control (target path following control by automatic steering) by the LKA controller 15 in the same manner as partially automated driving (PADS driving).

At the same time as activation of the partially automated lane change system, the automated driving controller 10 (path generating part 12) constantly generates a target path for changing the lane from a currently driving lane to a neighboring lane on the basis of the external information (lane markings of the vehicle's own driving lane and the neighboring lane, and positions and speeds of other vehicles driving in the vehicle's own driving lane and the neighboring lane) obtained by the environmental condition estimating part 11 through the external sensor 21 and the internal information (vehicle speed, yaw rate, and acceleration) obtained by the internal sensor 22.

The automated lane change target path is a path that leads from the currently driving lane to a state of driving on the center of the neighboring lane through lane change; for other vehicles driving in the neighboring lane, their future positions and speeds are predicted; and the lane keeping (LKA) function is stopped and automated lane change to the neighboring lane by automatic steering is performed (i) if the driver instructs lane change by operating turn signals or the like or (ii) if the driver approves (LKA off operation or the like) a system determination (HMI display) under a condition that it is determined that there is no other vehicle in a front area, rear area, and lateral area of the neighboring lane set according to the vehicle's speed.

During execution of automated lane change, the automated driving controller 10 (environmental condition estimating part 11) monitors the front area, rear area, and lateral area of the neighboring lane including the target path by the external information obtained through the external sensor 21, and makes a lane change stop determination on the basis of the vehicle's own position during lane change if intrusion or cutting-in of another vehicle to the areas is detected.

When lane change is stopped, the following target is changed to a center line of the lane (original lane) in which the vehicle was driving before lane change, and the target path and target speed are regenerated. Then, in order to follow the regenerated target path, a steering angle command is given from the LKA controller 15 to the EPS controller 31, a speed command is given to the ACC controller 14, and the vehicle returns to the original lane (automated lane return function).

When the vehicle has almost moved to the neighboring lane, for example, when three or more of four wheels enter the neighboring lane, lane change is not stopped and the lane change is continued. On the other hand, if it is determined that continuing the lane change is difficult, automated lane change is stopped and authority is transferred to the driver. Note that when the driver cannot take over, a minimal risk maneuver (MRM) is activated and safely stops at a roadside zone or the like.

Path Following Cruise and Vehicle Ahead Following Cruise in No-Lane Section

Figure 4:
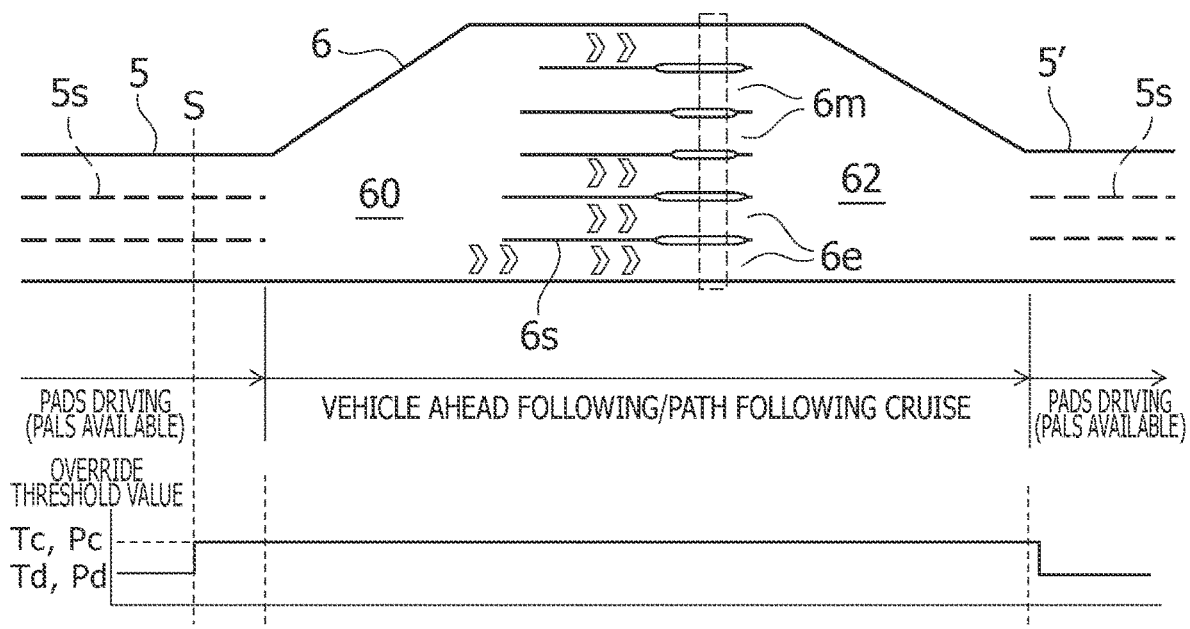
FIG. 4 is a timing chart showing relationship between a driving mode and override threshold values in a toll plaza section.

In PADS driving and automated lane change (PALS), the target path is generated on the basis of markings of the vehicle's own driving lane and the neighboring lane, and automatic steering is performed by path following control; therefore they cannot be performed in a no-lane section 60 before a toll plaza and a no-lane section 62 after passing through the toll plaza on a highway shown in FIG. 4. In such no-lane sections 60 and 62 with no lane marking, path following cruise or vehicle ahead following cruise is performed.

In the no-lane section 60 before the toll plaza, toll gates (6*e* and 6*m*) located in front of the vehicle are first detected, then a target gate to be passed through is selected from the toll gates and a target approach path is generated, and path following cruise is performed. When a preceding vehicle (vehicle ahead) is recognized during path following cruise toward the target gate (6*e* or 6*m*), the vehicle shifts to vehicle ahead following cruise targeting the preceding vehicle.

In the no-lane section 62 after passing through the toll plaza, positions of driving lanes in front of the vehicle are first detected, then a lane to be targeted is selected from the driving lanes and a target path is generated, and path following cruise is performed. When a preceding vehicle (vehicle ahead) is recognized during path following cruise toward the target lane, the vehicle shifts to vehicle ahead following cruise targeting the preceding vehicle.

Also during path following cruise toward the target gate or target lane in the no-lane sections 60 and 62 as described above, the front area, rear area, and lateral area including the target approach path are monitored with the external sensor 21, and when another vehicle enters the areas by the other vehicle's course change or the like, the driver is notified of authority transfer, shifting to manual driving via fallback control. This point will be described later.

Override Function

During the operation of the partially automated in-lane driving system (PADS), during automated lane change by the partially automated lane change system (PALS), and further during path following cruise or vehicle ahead following cruise in the no-lane section, both longitudinal control system (ACCS) and lateral control system (LKAS) can be overridden by the driver.

The longitudinal control system (ACCS) is overridden if an engine torque request by accelerator pedal operation of the driver or a deceleration request by brake pedal operation is equal to or greater than a corresponding override threshold value. These override threshold values are set to an accelerator operation amount (engine torque command value) or a brake operation amount (ESP hydraulic command value) based on which it is determined that the driver has intentionally performed acceleration/deceleration operation, and both are set according to the acceleration/deceleration characteristic and driving state of the vehicle.

That is, the ACC override stops ACC control if an operation amount or operation speed based on which it is determined that the driver has performed accelerator pedal operation or brake pedal operation with an intention of acceleration or deceleration with respect to the control vehicle speed is applied to the accelerator pedal or brake pedal, and shifts to driving by the driver's accelerator and brake operation.

The lateral control system (LKAS) that performs automatic steering for lane keeping support, automated lane change, and path following cruise or vehicle ahead following cruise in the no-lane section is overridden if a steering torque by the driver's manual steering 34 is equal to or greater than an override threshold value. The override threshold value by the steering intervention is set according to the steering characteristic and driving state of the vehicle.

That is, the steering override stops automatic steering and LKA control if an operation amount or operation speed based on which it is determined that the driver has performed steering with an intention of additive steering (in the same direction) or subtractive steering (in the opposite direction) with respect to the control steering torque is applied to a steering system, and shifts to driving by the driver's manual steering.

As described above, automated lane change (PALS) cannot be performed in the no-lane sections 60 and 62 of a toll plaza 6 on the highway shown in FIG. 4 and in these sections, path following cruise or vehicle ahead following cruise is performed, but, for example, when the automated lane return function is activated by intrusion of another vehicle to a predetermined area around the vehicle itself or when lane change cannot be continued during automated lane change started in a main line section 5 before the toll plaza 6, the vehicle may come close to other vehicles or the vehicle's behavior may become unstable due to excessive steering override or excessive brake override by the driver who is overwhelmed by the vehicle's behavior or authority transfer notice.

In the no-lane section 62 after passing through the toll plaza 6, vehicle ahead following cruise or path following cruise targeting the driving lane ahead is performed, but when the vehicle ahead following cruise or path following cruise cannot be continued due to cutting-in of another vehicle or the like, the vehicle may come close to other vehicles or the vehicle's behavior may become unstable due to excessive steering override or excessive brake override by the driver who is overwhelmed by the authority transfer notice as described above.

Excessive Operation Prevention Function in No-Lane Section Near Toll Plaza

The automated driving controller 10 according to the present invention has an excessive operation prevention function that, when the vehicle's own position with respect to the toll plaza 6 is detected by matching the vehicle's own position information by the positioning means 24 such as the GPS and the map information 23 or by image recognition for a display object such as a tollgate information display or distance sign detected by the external sensor 21 and the vehicle's own position reaches a predetermined point S near the toll plaza 6, changes the override threshold values serving as a determination criterion of operation intervention for stopping vehicle ahead following function and path following function to a value greater than during driving in a general section such as the main line section 5 with lane markings 5*s*.

Figure 5:
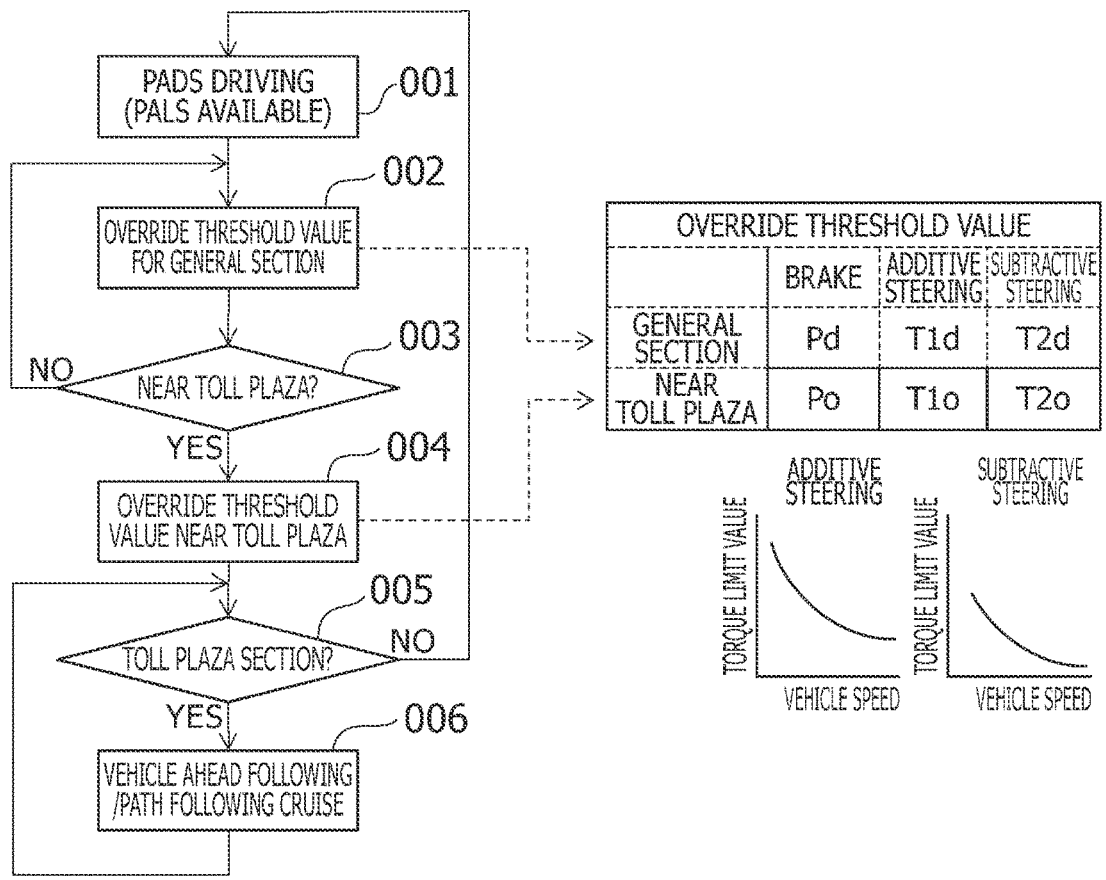
FIG. 5 is a flowchart showing control of the driving mode and the override threshold values in the toll plaza section.

FIG. 5 shows a driving control and excessive operation prevention flow in a no-lane section near the toll plaza of the highway, and as shown, when PADS driving (PALS can be performed) is performed in the general section such as the highway main line section 5 (step 001), override threshold values (Pd, T1*d*, and T2*d*) for the general section are set (step 002) and override determination is made on the basis of those.

During PADS driving (PALS driving), the vehicle's own position with respect to the toll plaza 6 is constantly detected (step 003), and when it is detected that the vehicle has reached the predetermined point S near the toll plaza 6, the override threshold values are altered to override threshold values (Po, T1*o*, and T2*o*) for the section near the toll plaza (step 004). The predetermined point S is a point at a predetermined distance (for example, 300 m) before the start point of the no-lane section 60 before the toll plaza, and this predetermined distance may be a fixed value, or may be set according to ACC set speed.

Detection of the vehicle's own position is continued after passing through the predetermined point S, and when the vehicle reaches the no-lane section 60 before the toll plaza, PADS driving (PALS driving) is switched to vehicle ahead following cruise or path following cruise (step 006). Thereafter, until the no-lane section 62 after passing through the toll plaza ends, the vehicle ahead following cruise or path following cruise is continued, and the override threshold values (Po, T1o, and T2o) for the section near the toll plaza are maintained.

As described above, by changing the steering override threshold value and brake override threshold value to a greater value when the vehicle reaches the predetermined point S near the toll plaza 6, excessive steering override and brake override by the driver who is overwhelmed by the automated lane change stop or operation takeover request are suppressed, which enables shift to vehicle ahead following cruise or path following cruise in the no-lane section 60, and thereby, approach to other vehicles, unstable behavior, or the like due to excessive steering override or excessive brake override can be avoided.

Because the steering override threshold value and brake override threshold value altered when the vehicle reached the predetermined point S near the toll plaza 6 are maintained until the no-lane section 62 after passing through the toll gate, even if vehicle ahead following cruise or path following cruise cannot be continued due to cutting-in of another vehicle or the like, thereby, approach to other vehicles, unstable behavior, or the like due to excessive steering override or excessive brake override by the driver who is overwhelmed by the authority transfer notice can be avoided.

The override threshold values are set, for example, as follows.

(1) Brake Override Threshold Value During Driving in General Section

If an ESP hydraulic command causing deceleration with respect to the ACC set speed (cruise set speed or vehicle ahead following speed) or ACC set acceleration is given by the driver's brake depression, brake override is reached and the driver's brake operation is given priority. An ESP hydraulic command value that causes deceleration corresponding to, for example, a speed of 2 km/h with respect to the ACC set speed or an ESP hydraulic command value that causes deceleration corresponding to 0.2 m/s$^2$ with respect to the ACC set acceleration is set as a threshold value Pd.

(2) Brake Override Threshold Value During Driving in No-Lane Section Near Toll Plaza A value greater than the brake override threshold value during driving in the general section, preferably in the range of 120% to 250%, and more preferably in the range of 150% to 220% of the brake override threshold value during driving in the general section is selected. For example, an ESP hydraulic command value that causes deceleration corresponding to a speed of 4 km/h with respect to the vehicle's current speed (or preceding vehicle following speed) or an ESP hydraulic command value that causes deceleration corresponding to 0.4 m/s$^2$ with respect to the ACC set acceleration is set as a threshold value Po.

(3) Steering Override Threshold Value During Driving in General Section

For an additive steering override threshold value during driving in the general section, a steering torque (steering torque calculated from the vehicle speed-steering angle-steering torque map) corresponding to a steering angle by which a virtual lateral displacement "y't" for reaching a virtual lateral position after "t" seconds becomes "yt+α" is set as an additive steering override threshold value T1$d$, where "α" is a constant determined based on vehicle speed.

In the case of subtractive steering, a value that is perceptible (determined by the steering angle, steering angle speed, or the like) and is applied in a direction of reducing the steering torque to a value (steering torque target value) obtained by converting a steering angle by which a virtual lateral displacement "yt" for reaching a virtual lateral position after "t" seconds becomes "yt+α" into a steering torque is set as a subtractive steering override threshold value T2$d$, where "α" is a constant determined based on vehicle speed.

(4) Steering Override Threshold Value During Driving in No-Lane Section Near Toll Plaza For an additive steering override threshold value, a value obtained by converting a steering angle calculated from virtual lateral displacement "y"t" (=yt+β, where β>α) during driving in the no-lane section near the toll plaza and the movement characteristics of the vehicle with respect to the virtual lateral displacement "yt" during driving in the general section into a steering torque is set as an additive steering override threshold value T1$o$.

For a subtractive steering override threshold value, a value obtained converting a steering angle calculated from virtual lateral displacement "y"t" (=yt−γ, where "γ" is greater than a lateral displacement corresponding to a steering torque X' Nm) during driving in the no-lane section near the toll plaza and the movement characteristic of the vehicle with respect to the virtual lateral displacement "yt" during driving in the general section into a steering torque is set as a subtractive steering override threshold value T2$o$.

Automated Lane Change Flow Before and Near Toll Plaza

Figure 6:
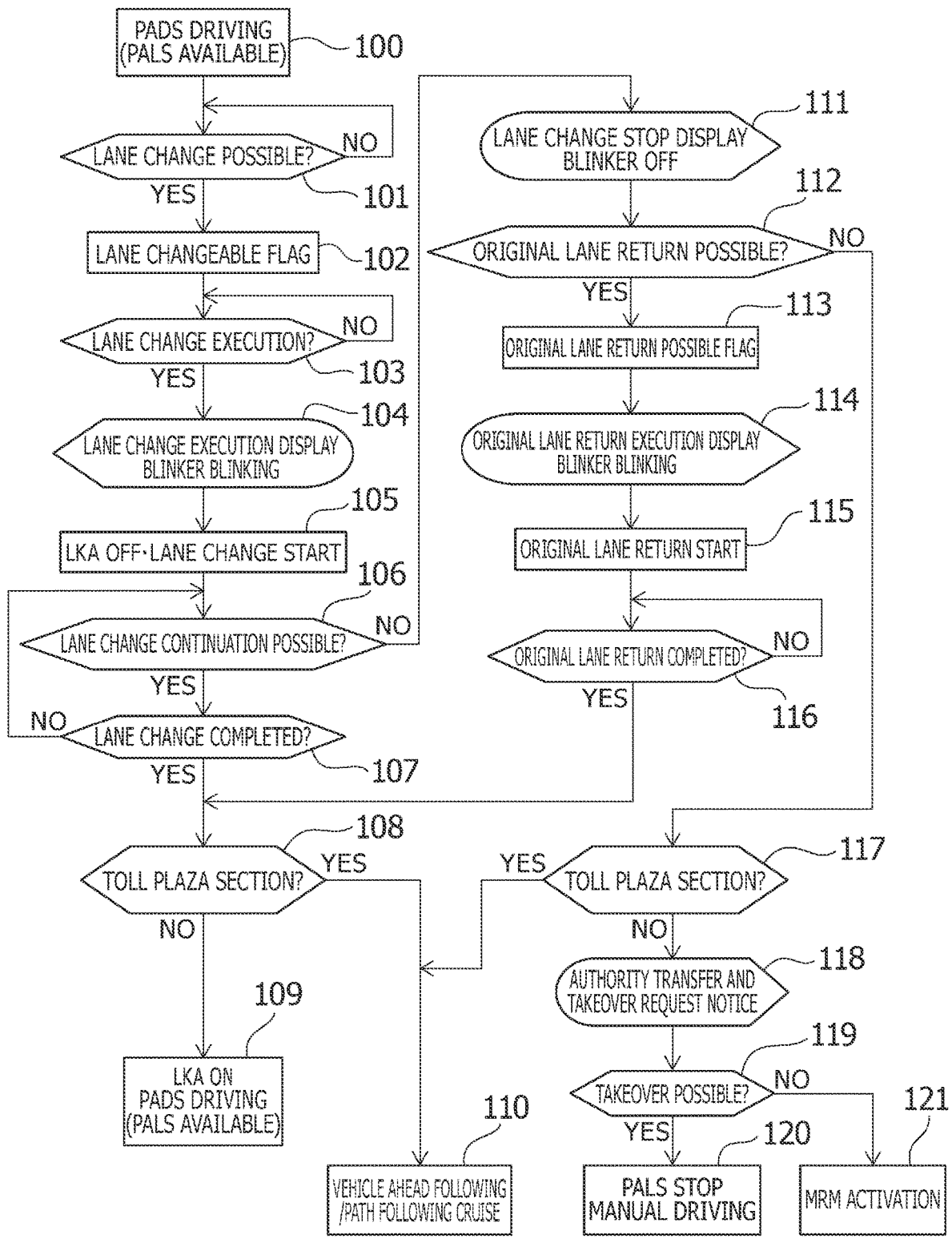
FIG. 6 is a flowchart showing automated lane change/driving control near the toll plaza.

Next, an automated lane change flow in the main line section 5 before and near a toll plaza on a highway and in the no-lane section 60 before the toll plaza will be described with reference to FIG. 6.

(1) Lane Change Feasibility Determination During PADS Driving

When the partially automated lane change system (PALS) is operating during PADS (ACCS and LKAS) driving by the partially automated in-lane driving system (step 100), the environmental condition estimating part 11 (external sensor 21) monitors whether there is another vehicle in the predetermined area (front area ZF, rear area ZR, and lateral area ZL) of the neighboring lane (step 101).

In the above, the front area ZF is an area of longitudinal direction: predetermined forward distance×lateral direction: lane width during driving+left and right neighboring lane width, the rear area ZR is an area of longitudinal direction: predetermined rearward distance×lateral direction: lane width during driving+left and right neighboring lane width, and the lateral area ZL is an area of longitudinal direction: vehicle length×lateral direction: left and right neighboring lane width. The predetermined forward distance is found from the minimum inter-vehicle distance ($S_0$), a vehicle head time (TH), and the vehicle's speed ($V_{ego}$), and the predetermined rearward distance is found from a vehicle head time (TH) and rearward speed ($V_{rear}$). The left and right neighboring lane width (corresponding width) is set to, for example, 3.5 m.

(2) Determination by Automated Lane Change System

If there is no other vehicle in the predetermined area of the neighboring lane, it is determined that the lane can be changed, and a lane changeable flag is set (step 102). In this situation, if the system determines that the lane should be changed due to, for example, appearance of a preceding vehicle that is travelling slower than the ACC set speed in front of the vehicle's lane, the system determination (execution of automated lane change) is displayed on an information display part in a head-up display or meter panel (step 103). Notification by voice or the like may be used.

(3) Automated Lane Change Start

If the driver approves the system determination by LKA off operation or the like, a turn signal in a lane change direction blinks for three seconds (step 104), then the lane keeping (LKA) function stops, and automated lane change to the center of the neighboring lane which is a target position is started (step 105).

(4) Lane Change Continuation Feasibility Determination

Also during the execution of automated lane change, the environmental condition estimating part 11 (external sensor 21) continues monitoring the predetermined area (step 106), lane change is continued if there is no other vehicle in the predetermined area of the target lane, and it is determined whether lane change is completed (step 107). The completion of lane change is determined on the basis that the vehicle's deviation from a target lateral position (for example, lane center) of lane change becomes within a predetermined value (for example, lane center±0.5 m).

(5) Automated Lane Change Stop (Override Threshold Value Change)

If another vehicle enters the predetermined area of the target lane due to the preceding vehicle's sudden lane change, sudden braking, or the like, lane change is stopped, lane change stop is displayed on the information display part or notified by voice or the like, and the turn signal is turned off at the same time; at this time, even if the vehicle's own position has not reached the predetermined point S near the toll plaza 6 yet, the override threshold values are altered to the override threshold values (Po, T1o, and T2o) for the section near the toll plaza (step 111).

(6) Original Lane Return Feasibility Determination-Original Lane Return

At the same time, it is determined whether the vehicle can return to the original lane by the automated lane return function (whether there is another vehicle in the predetermined area of the original lane) (step 112), if the vehicle can return to the original lane, a lane changeable flag is set (step 113), execution of original lane return is displayed on the information display part, a turn signal in the original lane direction blinks (step 114), original lane return is started (step 115), and then it is determined whether original lane return is completed (step 116). The completion of original lane return is determined on the basis that the vehicle's deviation from a target lateral position (for example, original lane center) of the original lane becomes within a predetermined value (for example, original lane center±0.5 m).

(7) Unable to Return to Original Lane-Vehicle Ahead Following/Path Following Cruise On the other hand, when the vehicle cannot return to the original lane due to presence of another vehicle or the like, it is determined whether the vehicle's own position is in the toll plaza section (no-lane section 60) (step 117), and if it is in the toll plaza section (no-lane section 60), the vehicle shifts to vehicle ahead following cruise or path following cruise (step 110).

(8) Unable to Return to Original Lane-Authority Transfer and Takeover Request Notice If the vehicle cannot return to the original lane and the vehicle's own position is in the main line section 5, the authority transfer and takeover request to the driver are displayed on the information display part (step 118), and if the driver takes over steering, shift to fallback control of the PALS function (automated lane return function) is performed, and the PALS function is stopped, shifting to manual driving (step 120). Steering takeover of the driver is determined based on hands-on detection by a steering sensor (step 119).

(9) Unable to Takeover and MRM Activation

If the driver does not take over steering when a predetermined time has elapsed (for example, four seconds) or if it is determined takeover cannot be performed by a driver monitor or the like, the minimal risk maneuver (MRM) activates and the vehicle retreats to the roadside zone or the like by automatic steering and stops automatically (step 121).

(10) Toll Plaza Section Determination

When automated lane change is completed (step 107) and when automated lane return is completed (step 116), it is determined whether the vehicle's own position is in the toll plaza section (no-lane section 60), and if the vehicle's own position is in the main line section 5, LKA is turned on, shifting to PADS driving (step 109). On the other hand, if the vehicle's own position is in the toll plaza section (no-lane section 60), the vehicle shifts to vehicle ahead following cruise or path following cruise (step 110).

(11) Override Determination

During the above-described automated lane change by the partially automated lane change system (PALS) and also during path following cruise or vehicle ahead following cruise in the no-lane section 60, override determination for brake operation and steering operation is made, and if any of an ESP hydraulic command by the driver's brake pedal operation or a steering torque by steering operation exceeds the override threshold values, override is reached, shifting to manual driving.

As described before, in the automated driving controller 10 according to the present invention, the override threshold values (Po, T1o, and T2o) for the section near the toll plaza are set values greater than the override threshold values (Pd, T1d, and T2d) for the general section mainly applied to the main line section 5, and for the section near the toll plaza (after reaching the predetermined position S), the override threshold values (Po, T1o, and T2o) for the section near the toll plaza are applied; even when the vehicle has not reached the predetermined position S, if it is determined that lane change cannot be continued during automated lane change, lane change stop is notified and at the same time the override threshold values (Po, T1o, and T2o) for the section near the toll plaza are applied; as a result, override due to excessive steering intervention or brake operation intervention is suppressed in the following aspects, and thereby approach to other vehicles, unstable behavior, and the like due to it can be avoided.

(i) When it is determined in step 106 that lane change cannot be continued and lane change stop is notified to the information display part in step 111, even if the driver who is overwhelmed by the automated lane change stop performs excessive steering intervention or brake operation intervention, override is suppressed, which enables shift to original lane return by the automated driving controller 10, and thereby approach to other vehicles, unstable behavior, and the like due to excessive steering override and brake override can be avoided.

(ii) When original lane return is started in step 115, if the driver who is overwhelmed by the vehicle's behavioral change performs excessive steering intervention or brake operation intervention, override is also suppressed, which enables continuation of original lane return, and thereby approach to other vehicles, unstable behavior, and the like due to excessive steering and brake operation can be avoided.

(iii) When it is determined that the vehicle's own position is in the toll plaza section (no-lane section 60) in step 108 or step 117 and shift to vehicle ahead following cruise or path following cruise is performed, if the driver who is overwhelmed by the vehicle's behavioral change performs excessive steering intervention or brake operation intervention, override is suppressed, which enables shift to vehicle ahead following cruise or path following cruise, and thereby approach to other vehicles, unstable behavior, and the like due to excessive steering and brake operation can be avoided.

(iv) When the driver is notified of the authority transfer and takeover request in step 118, if the driver who is overwhelmed by the notification performs excessive steering intervention or brake operation intervention, override is suppressed, which enables shift to manual driving via fallback control, and thereby approach to other vehicles, unstable behavior, and the like due to excessive steering override and brake override can be avoided.

Figure 7:
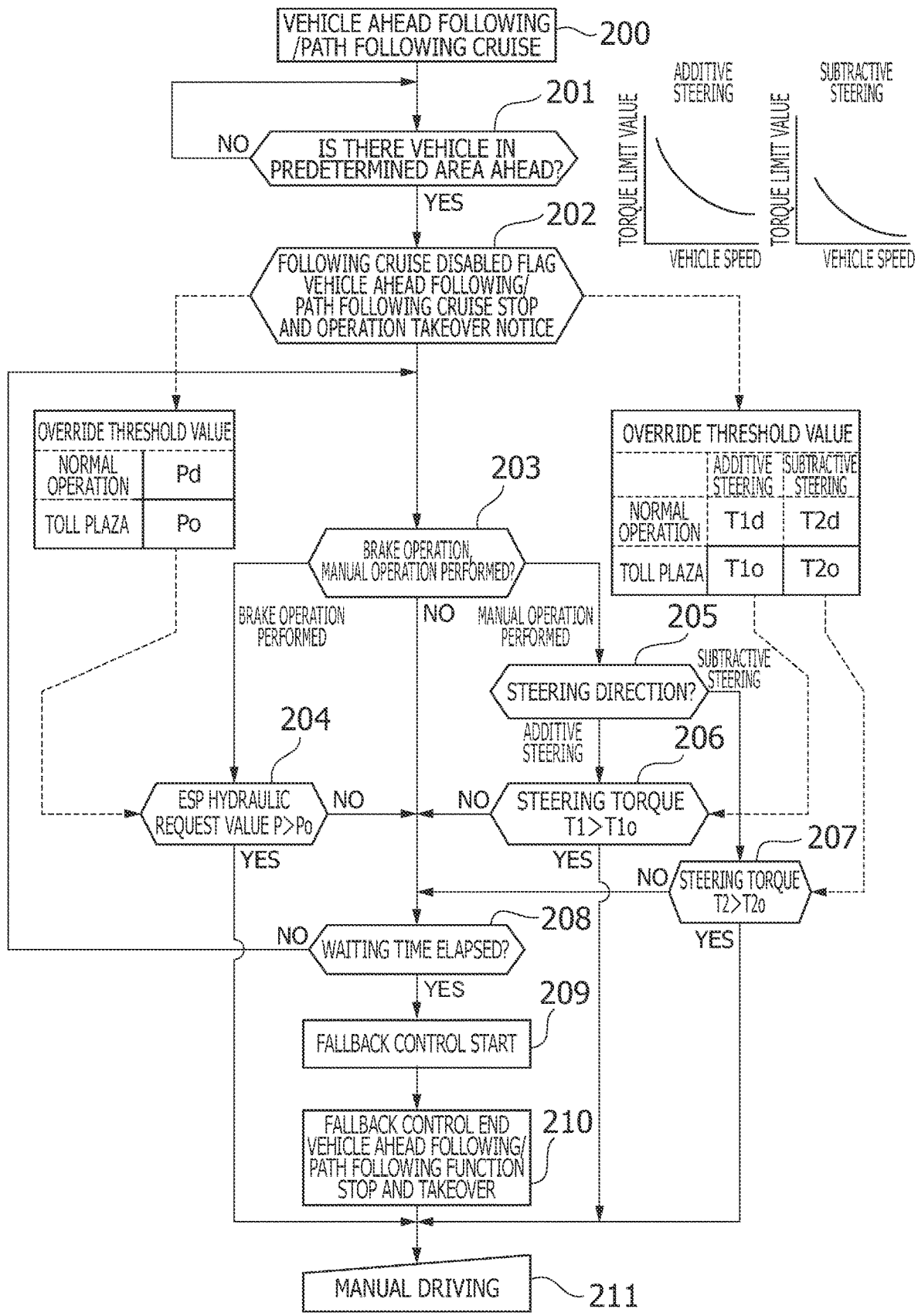
FIG. 7 is a flowchart showing override prevention control due to excessive operation intervention after passing through the toll plaza.

Excessive Operation Prevention Flow in No-Lane Section after Passing Through Toll Plaza Next, an automated lane change flow in the no-lane section 62 after passing through the toll gate of the highway will be described with reference to FIG. 7.

(1) Vehicle Ahead Following/Path Following Cruise

As described before, when the vehicle reached the no-lane section 60 before the toll plaza, the vehicle shifted from PADS driving (PALS driving) to vehicle ahead following cruise or path following cruise, and the vehicle ahead following cruise or path following cruise is continued in the no-lane section 62 after passing through the toll gate (step 200), and the environmental condition estimating part 11 (external sensor 21) monitors whether there is another vehicle in a predetermined area (front area ZF and lateral area ZL) (step 201).

(2) Following Cruise Stop and Operation Takeover Notice (Override Threshold Value Setting)

If the environmental condition estimating part 11 (external sensor 21) determines that there is another vehicle in the predetermined area (front area ZF and lateral area ZL), a following cruise disabled flag is set, vehicle ahead following/path following cruise stop and operation takeover are displayed on the information display part in the head-up display or meter panel (step 202). Notification by voice or the like may be used. At the same time, counting of a waiting time (for example, two seconds) until shift to following cruise fallback control is started.

At this time, if the override threshold values are changed to the override threshold values (Po, T1o, and T2o) for the section near the toll plaza at the time of passing through the predetermined point S before the toll plaza as described before, the values are maintained, and if they are reset when passing through the toll gate (6e or 6m) or the like, they are set to the override threshold values (Po, T1o, and T2o) for the section near the toll plaza again.

(3) Determination of Whether Brake Operation and Manual Steering are Performed

At this time point, the following control (inter-vehicle control and automatic steering) is still operating, and whether brake operation is performed by the driver is determined with a position sensor attached to a brake pedal, and at the same time, whether the manual steering 34 is performed is determined with a torque sensor attached to the EPS controller 31 (step 203).

(4) Brake Override Determination

When the driver's brake operation is detected in step 203, the ESP hydraulic command value by the driver's brake depression is compared with the override threshold value Po (step 204).

i) If the ESP hydraulic command value P>Po, it is determined that the operation is brake override and the override is carried out immediately, shifting to manual driving.

ii) If the ESP hydraulic command value P≤Po, the override is not carried out, and inter-vehicle control and automatic steering continue.

(5) Steering Direction Determination

On the other hand, when it is determined in step 203 that manual steering is performed from a detection value of the torque sensor attached to the EPS controller 31, a steering direction of the manual steering 34 is determined (step 205). It is determined to be additive steering if the torque is applied to the steering torque value during automatic steering before the driver's steering is applied in a direction which increases the steering torque, and it is determined to be subtractive steering if the torque is applied in a direction which decreases the steering torque.

(6) Additive Steering Override Determination

If the steering is determined to be additive steering in the steering direction determination, the steering torque is compared with the additive steering override threshold value T1o (step 206).

i) If the steering torque>the additive steering override threshold value T1o, it is determined that the operation is override and the override is carried out immediately, shifting to manual driving.

ii) If the steering torque≤the additive steering override threshold value T1o, the override is not carried out, and inter-vehicle control and automatic steering continue.

(7) Subtractive Steering Override Determination

If the steering is determined to be subtractive steering in the steering direction determination, the steering torque is compared with the subtractive steering override threshold value T2o (step 207).

i) If the steering torque>the subtractive steering override threshold value T2o, it is determined that the operation is override, and the override is carried out immediately, shifting to manual driving.

ii) If the steering torque≤the subtractive steering override threshold value T2o, the override is not carried out, and inter-vehicle control and automatic steering continue.

(8) Determination of Takeover Elapsed Time-Following Cruise Fallback Control Start In the case of continuing following cruise (inter-vehicle control and automatic steering) through these override determinations (steps 204-207), counting of an elapsed time from notifying the vehicle ahead following/path following cruise stop (inter-vehicle control and automatic steering function stop) and the steering takeover in step 202 is continued (step 208), and following cruise (inter-vehicle control and automatic steering) fallback control is started when the waiting time (two seconds) passes (step 209).

Inter-vehicle control (ACC function) fallback control: the acceleration/deceleration command value (vehicle speed command) input into the engine controller 32 is gradually decreased to 0 km/h/s with the predetermined inclination, and also the deceleration command value input into the ESP controller 33 is decreased to 0 m/s² with the predetermined inclination.

Automated steering fallback control: the steering torque command value input into the EPS controller is gradually decreased to 0 Nm with the predetermined inclination.

(9) Fallback Control End-Vehicle Ahead Following/Path Following Function Stop and Steering Takeover When the path following fallback control ends, the vehicle ahead following/path following function is stopped and operation takeover to the driver is performed (step 210), shifting to manual driving by the driver's accelerator/brake operation and steering (step 211).

Although override by excessive steering at the time of notification of following cruise stop and operation takeover can be basically prevented by changing the override threshold values as described above, if the manual steering is equal to or greater than the override threshold values in the above-described override determination (steps 206 or 207), the ACC and automatic steering functions will be overridden by the manual steering.

When the override threshold value is set (step 202), by setting an upper limit value of the steering torque or steering angle (in inverse proportion to vehicle speed/decreases as vehicle speed increases) set according to vehicle speed by the EPS controller 31 to a value lower than during driving in the general section, or by changing a steering gain of manual steering to a smaller value by the ESP controller 31, excessive steering can be prevented when it is overridden by the manual steering.

It is preferable that the override threshold values be maintained from the operation takeover notice to the end of fallback control. By doing so, operation takeover can be gradually performed in a state in which steering control by the automatic steering function and inter-vehicle control by the ACC function are partially active, and smooth operation takeover can be performed.

Operation and Effects

As detailed above, because the driving control apparatus for the vehicle according to the present invention is configured so that, when the vehicle's own position reaches the predetermined point S before the toll plaza 6, the override threshold values serving as a determination criterion of operation intervention to stop the vehicle ahead following function and path following function are altered to a value greater than during driving in the general section such as the main line section 5 with lane markings 5s and the override threshold values are maintained in the no-lane sections 60 and 62 before and after the toll gate, excessive operation prevention effects in the cases exemplified below can be expected.

Example 1: Lane Change Stop Near Toll Plaza Following Cruise in No-Lane Section

Figure 8A:
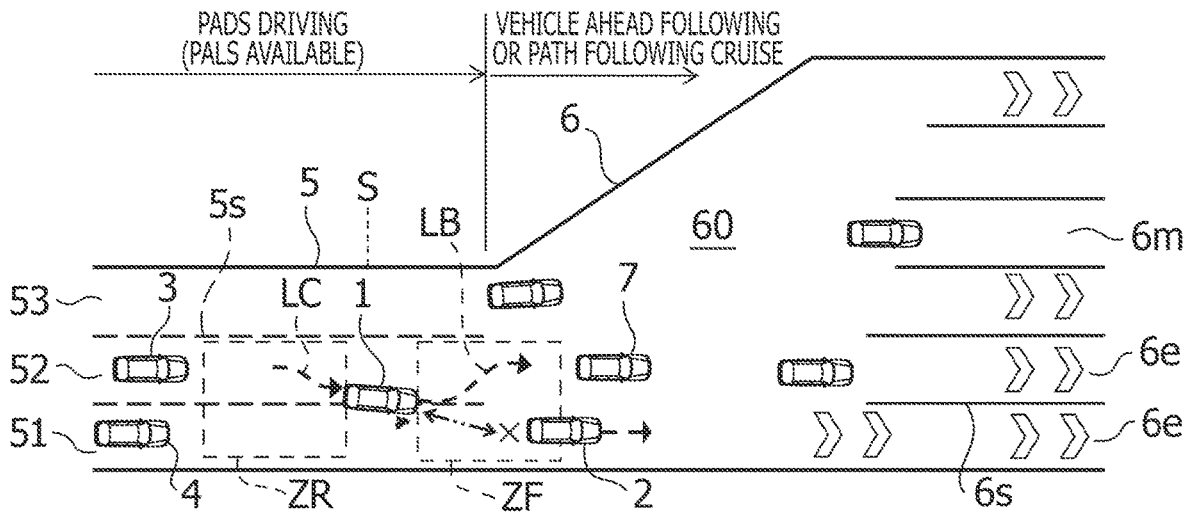
FIG. 8A is a schematic plan view exemplifying automated lane return when automated lane change is stopped before the toll plaza.

For example, as shown in FIG. 8A, while the vehicle 1 that was driving in a central lane 52 of the highway main line section 5 having three lanes (51, 52, and 53) on one side is carrying out automated lane change (LC) to the neighboring lane 51 before the toll plaza 6, if a preceding other vehicle 2 that was driving in the right side neighboring lane 51 enters the no-lane section 60 and suddenly brakes, enters the front area ZF of the vehicle 1, and makes it impossible to continue the automated lane change, shift to original lane return (LB) is performed.

At this time, even if the driver who is overwhelmed by the lane change stop display or the vehicle's behavior performs excessive steering intervention, override is avoided because the steering override threshold values serving as the determination criterion of steering intervention are altered to a value greater than during driving in the general section, and shift to the original lane return (LB) can be continued.

Figure 8B:
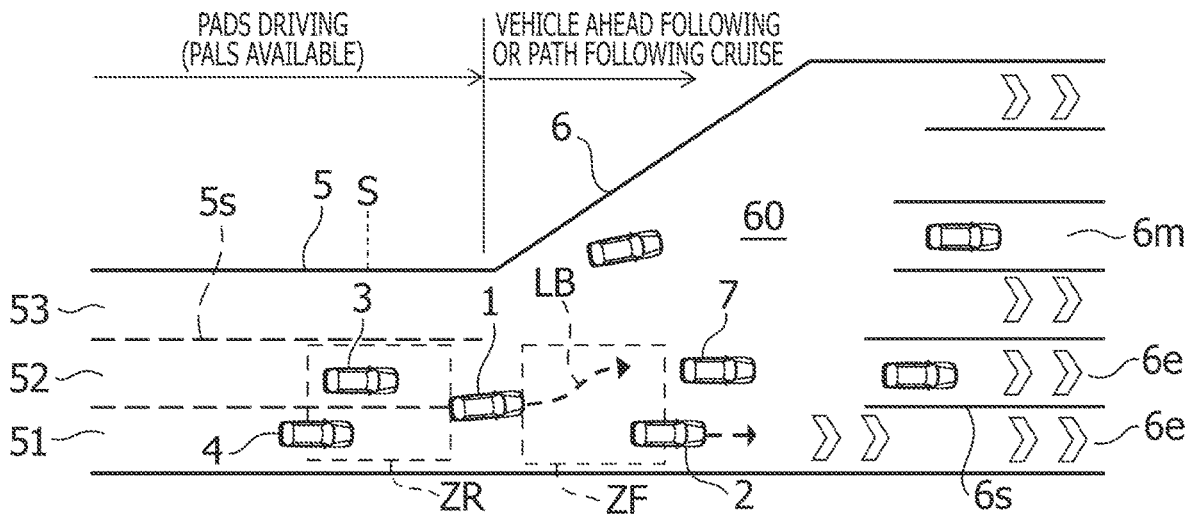
FIG. 8B is a schematic plan view exemplifying automated lane return stop.

Furthermore, as shown in FIG. 8B, when following other vehicles 3 and 4 enter the rear area ZR of the vehicle 1 and it is determined that original lane return (LB) cannot be performed, the authority transfer and operation takeover request are notified if the vehicle 1 has not reached the no-lane section 60. At this time, even if the driver who is overwhelmed by the notification performs excessive steering intervention or brake operation intervention, override is avoided because the override threshold values serving as the determination criterion of steering intervention and operation intervention are altered to a value greater than during driving in the general section, and shift to fallback control can be performed in the state in which the inter-vehicle control and automated steering function is continued.

Figure 8C:
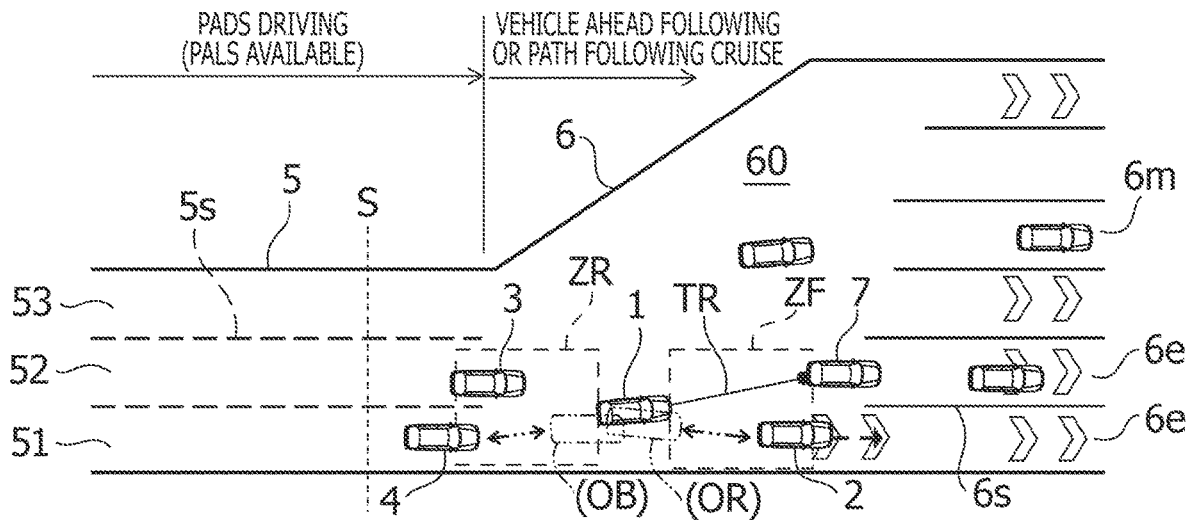
FIG. 8C is a schematic plan view exemplifying override prevention control when shifting to vehicle ahead following cruise.

If the vehicle 1 has reached the no-lane section 60, as shown in FIG. 8C, it is possible to shift to vehicle ahead following cruise (TR) targeting a preceding other vehicle 7, granting that the driver who is overwhelmed by a behavioral change performs excessive steering intervention or brake operation intervention, override is avoided because the override threshold values serving as the determination criterion of steering intervention and operation intervention are altered to a value greater than during driving in the general section, and thereby, approach to the preceding vehicle 2 due to excessive steering override (OR) and approach to the following other vehicles 3 and 4 due to excessive brake operation override (OB) can be prevented.

Example 2: Following Cruise in No-Lane Section after Passing Through Toll Gate

Figure 9A:
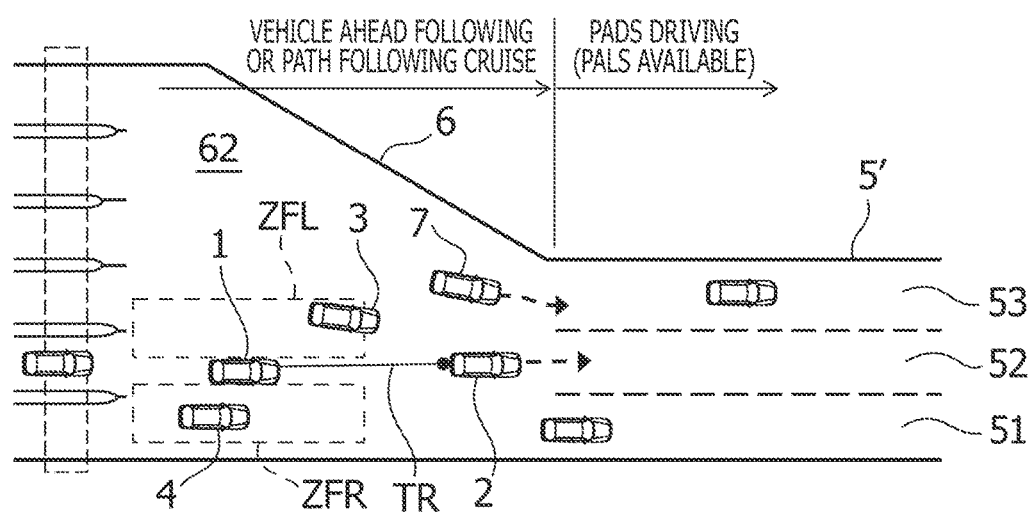
FIG. 9A is a schematic plan view exemplifying vehicle ahead following cruise after passing through the toll plaza.
Figure 9B:
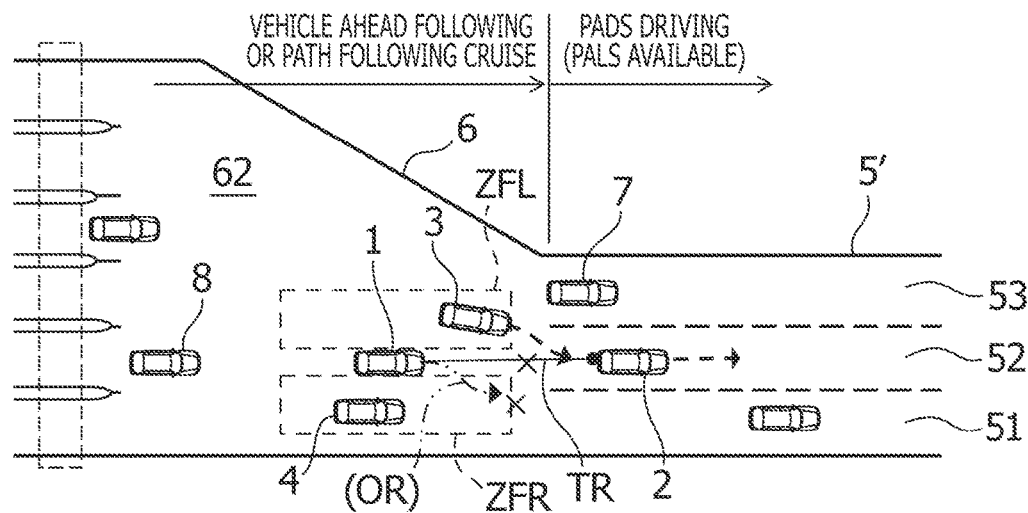
FIG. 9B is a schematic plan view exemplifying interruption of the vehicle ahead following cruise.

Next, as shown in FIG. 9A, while the vehicle 1 that passed through the toll gate is performing vehicle ahead following cruise (TR) targeting a preceding other vehicle 2 in the no-lane section 62, when another vehicle 3 that was driving in a left front area ZFL cuts in front of the vehicle 1 (to avoid a preceding other vehicle 7) as shown in FIG. 9B, even if the driver who is overwhelmed by the vehicle 3's behavior performs excessive steering intervention or brake operation intervention, override is avoided because the override threshold values serving as the determination criterion of steering intervention and operation intervention are altered to a value greater than during driving in the general section, thereby, approach to another vehicle 4 in a right front area ZFR due to excessive steering override (OR) can be prevented.

Figure 9C:
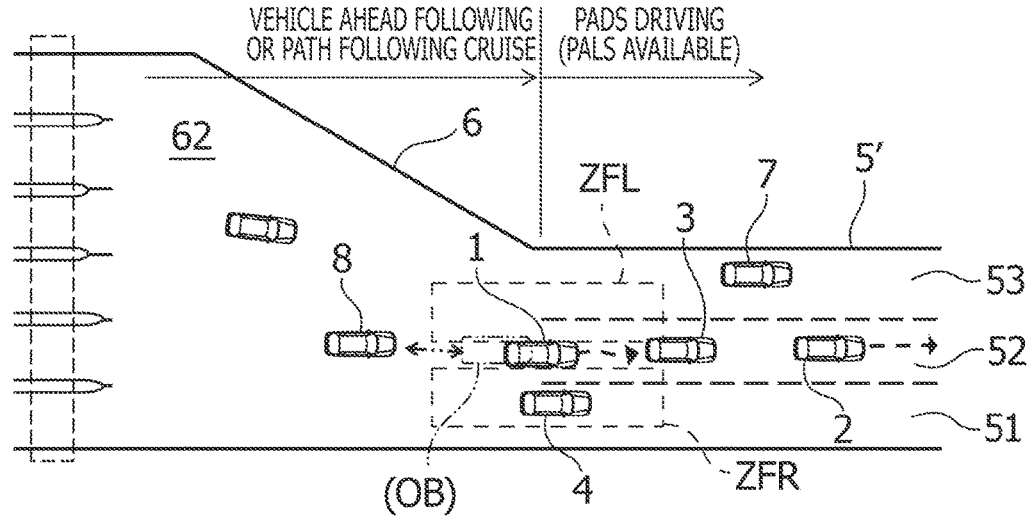
FIG. 9C is a schematic plan view exemplifying override prevention control when the vehicle ahead following cruise is interrupted.

Because excessive brake operation override (OB) is avoided, approach to a following other vehicle 8 is prevented as shown in FIG. 9C, inter-vehicle control and automatic steering are continued, shift to vehicle ahead following cruise targeting the preceding other vehicle 3 can be performed, and when the vehicle passes through the no-lane section 62 and enters the main line section 5' and lane recognition by the external sensor 21 is resumed, shift to PADS driving (PALS driving) can be performed.

Although the embodiment has described a case in which the brake override threshold value is set based on the deceleration request by the driver's brake pedal operation, the brake override threshold value can also be configured to be set based on the driver's brake pedal depression amount, that is, a brake pedal position.

Although the embodiment has exemplified a case in which the steering override threshold value is set based on the steering torque, the steering override threshold value can also be configured to be set based on the steering angle, steering angle speed, or the like.

Although some embodiments of the present invention have been described above, the present invention is not limited to the embodiments, and various modifications and changes are possible within the scope of the present invention.

What is claimed is:

1. A driving control apparatus for a vehicle, comprising:
an environmental condition estimating part including a surrounding recognition function for recognizing a vehicle's lane and neighboring lanes and other vehicles in the respective lanes and a function for obtaining the vehicle's moving state;
a path generating part for generating a target path on the basis of information obtained by the environmental condition estimating part; and
a vehicle control part configured to perform speed control and steering control for causing the vehicle to follow the target path,
wherein the environmental condition estimating part includes means for obtaining the vehicle's own position near a toll plaza, having
a vehicle ahead following function for driving targeting a vehicle ahead,
wherein the driving control apparatus has a function for altering override threshold values serving as a determination criterion of the operation intervention for stopping the vehicle ahead following function and a path following function to a value greater than during driving in a general section with lane markings when the vehicle's own position reaches a predetermined point near a section with no lane marking before the toll plaza.

2. The driving control apparatus for the vehicle according to claim 1, wherein the override threshold values altered to the greater value are configured to be maintained from the section with no lane marking before the toll plaza until reaching a general section with lane markings via a section with no lane marking after passing through the toll plaza excluding or including a section with lane markings before and after a toll gate.

3. The driving control apparatus for the vehicle according to claim 2, wherein during driving by the vehicle ahead following function in the section with no lane marking after passing through the toll plaza or during path following cruise targeting a driving lane of the general section with lane markings ahead, when it is detected that another vehicle enters the vehicle's predetermined area by the surrounding recognition function, a driver is notified of stopping the vehicle ahead following function or the path following function and operation takeover, and fallback control of the functions is configured to be performed.

4. The driving control apparatus for the vehicle according to claim 1, further comprising:
a function for performing automated lane change to a neighboring lane when the vehicle's own position is in the general section with lane markings and there is no other vehicle in a predetermined range of the neighboring lane; and
a function for stopping lane change and returning to an original lane when it is detected that another vehicle enters the vehicle's predetermined area by the surrounding recognition function during lane change by the function for performing automated lane change,
wherein, when it is detected that another vehicle enters the vehicle's predetermined area by the surrounding recognition function, if the vehicle's own position is in the section with no lane marking before the toll plaza, shift to driving by the vehicle ahead following function or path following cruise targeting a toll gate is configured to be performed.

5. The driving control apparatus for the vehicle according to claim 1, wherein the means for obtaining the vehicle's own position near the toll plaza includes matching the vehicle's own position information by positioning means and map information or image recognition for a display object such as a tollgate information display or a distance sign.

6. The driving control apparatus for the vehicle according to claim 1, further comprising:
an ACC function for performing constant speed cruise according to a target speed when there is no preceding other vehicle in the vehicle's lane and performing following cruise by maintaining a predetermined inter-vehicle distance when there is a preceding other vehicle and an LKA function for maintaining cruise in the vehicle's lane by following control to the target path,
wherein the override threshold values also serve as override threshold values serving as a determination criterion of the operation intervention for stopping the ACC function and/or the LKA function.

7. The driving control apparatus for the vehicle according to claim 1, wherein the override threshold values include a brake override threshold value serving as a determination criterion of brake operation intervention and/or a steering override threshold value serving as a determination criterion of steering operation intervention.

8. A driving control apparatus for a vehicle, comprising:
an environmental condition estimating part including a surrounding recognition function for recognizing a vehicle's lane and neighboring lanes and other vehicles in the respective lanes and a function for obtaining the vehicle's moving state;
a path generating part for generating a target path on the basis of information obtained by the environmental condition estimating part; and
a vehicle control part configured to perform speed control and steering control for causing the vehicle to follow the target path, and having
a vehicle ahead following function for driving targeting a vehicle ahead,
wherein the driving control apparatus has a function for altering override threshold values serving as a determination criterion of the operation intervention for stopping the vehicle ahead following function and a path following function to a value greater than during driving in a general section with lane markings when the vehicle's own position passes through a toll gate or a section with lane markings before and after the toll gate.

9. The driving control apparatus for the vehicle according to claim 8, wherein the override threshold values altered to the greater value are configured to be maintained until reaching a general section with lane markings via a section with no lane marking after passing through a toll plaza.

10. The driving control apparatus for the vehicle according to claim 9, wherein during driving by the vehicle ahead following function in the section with no lane marking after passing through the toll plaza or during path following cruise targeting a driving lane of the general section with lane markings ahead, when it is detected that another vehicle enters the vehicle's predetermined area by the surrounding recognition function, a driver is notified of stopping the vehicle ahead following function or the path following function and operation takeover, and fallback control of the functions is configured to be performed.

11. A driving control apparatus for a vehicle, comprising:
- an environmental condition estimating part including a surrounding recognition function for recognizing a vehicle's lane and neighboring lanes and other vehicles in the respective lanes and a function for obtaining the vehicle's moving state;
- a path generating part for generating a target path on the basis of information obtained by the environmental condition estimating part; and
- a vehicle control part configured to perform speed control and steering control for causing the vehicle to follow the target path, having:
- a vehicle ahead following function for driving targeting a vehicle ahead; and
- a function for notifying a driver of stopping the vehicle ahead following function or a path following function and operation takeover and performing fallback control of the functions when it is detected that another vehicle enters the vehicle's predetermined area by the surrounding recognition function during driving in a section with no lane marking after passing through the toll plaza,
- wherein the driving control apparatus has a function for altering override threshold values serving as a determination criterion of the operation intervention for stopping the functions to a value greater than during driving in a general section with lane markings when notifying the driver of the function stop and operation takeover.

12. The driving control apparatus for the vehicle according to claim 11, wherein the override threshold values altered to the greater value are configured to be maintained until reaching a general section with lane markings via a section with no lane marking after passing through the toll plaza.

* * * * *